(No Model.)  2 Sheets—Sheet 1.

S. LEEK & J. NORTON.
PIPE WELDING APPARATUS.

No. 529,280.   Patented Nov. 13, 1894.

WITNESSES

INVENTORS
Samuel Leek, and John Norton
by their Attorneys
W. Bakewell & Sons (No Model.)　　　　S. LEEK & J. NORTON.　　2 Sheets—Sheet 2.
PIPE WELDING APPARATUS.

No. 529,280.　　　　　　　Patented Nov. 13, 1894.

WITNESSES　　　　　　　　　INVENTORS.

UNITED STATES PATENT OFFICE.

SAMUEL LEEK AND JOHN NORTON, OF McKEESPORT, PENNSYLVANIA.

PIPE-WELDING APPARATUS.

SPECIFICATION forming part of Letters Patent No. 529,280, dated November 13, 1894.

Application filed May 24, 1894. Serial No. 512,295. (No model.)

*To all whom it may concern:*

Be it known that we, SAMUEL LEEK and JOHN NORTON, both of McKeesport, in the county of Allegheny and State of Pennsylvania, have invented a new and useful Improvement in Pipe-Welding Apparatus, of which the following is a full, clear, and exact description, reference being had to the accompanying drawings, forming part of this specification, in which—

Figure 1:
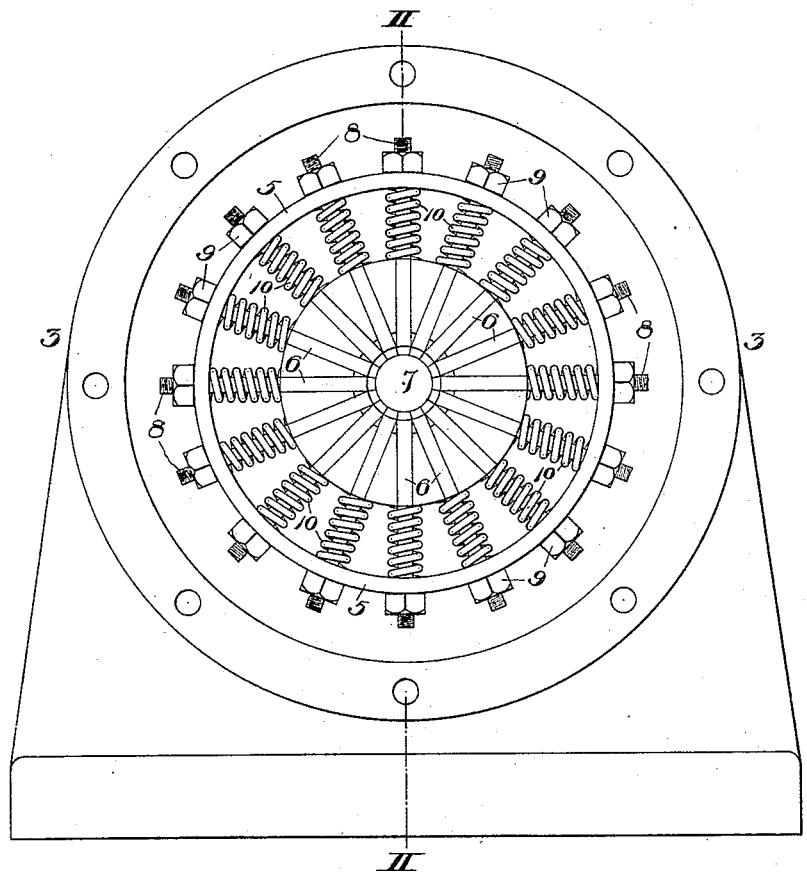
Figure 2:
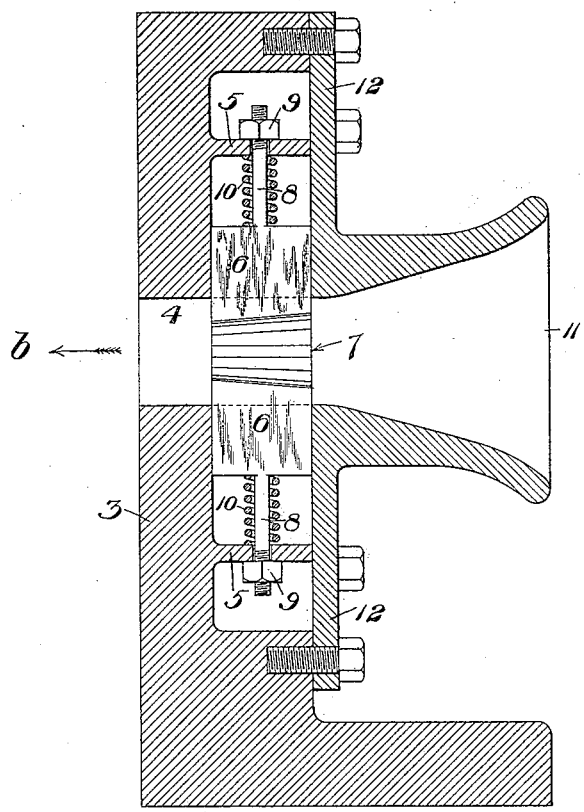
Figure 3:
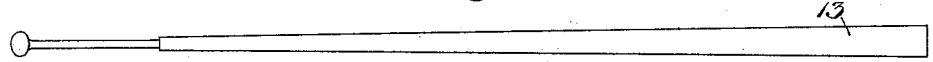

Figure 1 shows in front elevation a pipe-welding die constructed in accordance with my invention; the cover-plate 12 being removed. Fig. 2 is a vertical central section on the line II—II of Fig. 1. Fig. 3 is a view on a smaller scale of one of the skelp plates.

Like symbols of reference indicate like parts in each of the figures.

The object of our invention is to provide a die by the use of which a skelp plate, properly tapered in shape can be welded so as to form a tapered pipe for use in making telegraph poles and other articles constituted of hollow tapered bars or pipes.

The die-box, which contains the parts of our improved welding die, comprises a metal block 3, having a central hole 4 for the passage of the pipe, and on one side a circular rib 5, which constitutes a support for the die-sections. These die-sections consist of a series of steel plates 6 set within the circle of the rib 5, and arranged radially with reference to the central hole 4, so that when in normal position their inner edges shall be in contact and shall afford a round hole or eye 7 for passage of the skelp. Each section has an outwardly projecting stem or bolt 8 which passes through the rib 5, and has on the outer side of the rib an adjusting nut 9, and spiral springs 10 are set around each of the stems or bolts between the rib and the die section, so as to exert on each a constant inward pressure, the inward motion and spring-tension of each section being limited adjustably, however, by its nut 9. The inner edge of each section is tapered or inclined, so that the hole 7 flares from the front to the back of the die, as shown in Fig. 2. At the back side of the die is a flaring guide mouth 11 whose function is to direct the skelp into the die, and which is preferably made integral with or attached to a cover-plate 12 bolted to the back of the die-block to hold the die-sections in position.

The operation is as follows: The skelp-plate 13 cut in tapered form as shown in Fig. 3, is passed through a bell of usual construction, not shown, by which it is dished or turned into concave form approximating the form of a pipe, and then, having been heated to a welding heat, it is introduced, smaller end first, into the eye 7, and is drawn therethrough by a suitable tang or tongs in the direction of the arrow *b*. In the passage of the skelp through this hole, it is acted upon as in the ordinary pipe-welding die, its edges are forced together and welded, and as the circumferential width of the skelp within the eye gradually increases, the die-sections are correspondingly forced outward against the pressure of the springs so as to present a constantly enlarging hole, but as the springs are made of sufficient strength to force the edges of the skelp together in firm contact, the welding action is continuous and uninterrupted. The skelp may be passed through the die several times, or as often as the case may require.

The advantages of our invention will be appreciated by those skilled in the art. The die is simple in construction, it is easy to operate, and performs its work very efficiently.

Within the scope of the invention as defined in the claims, modifications in the construction and arrangement of the parts may be made. For example, instead of the springs for forcing the die sections inwardly, the die sections may be provided with weights, levers, cranks or gears to cause their radial movement, the essential condition of the invention, broadly stated, being that the die sections are radially movable to and from the center of the die to vary gradually the diameter of the central hole or eye.

We claim—

1. A pipe die comprising a series of radially sliding spring-backed sections, whose inner edges are arranged in a circle; substantially as described.

2. A pipe die comprising a series of radially arranged sliding metal plates, whose inner edges are arranged in a circle, and springs by which they are held inwardly; substantially as described.

3. A pipe die comprising a series of outwardly movable sections, whose inner edges are arranged in a circle, in combination with a die block having a surrounding support through which guide stems on the sections extend, and springs; substantially as described.

4. A pipe die comprising a series of radially sliding sections, whose inner edges are arranged in a circle, and a cover plate by which the sections are confined; substantially as described.

In testimony whereof we have hereunto set our hands.

SAMUEL LEEK.
JOHN X NORTON.
his  mark

Witnesses:
SAMUEL LEEK, Jr.,
WM. T. DART.